(12) United States Patent
den Hartog et al.

(10) Patent No.: US 8,081,636 B2
(45) Date of Patent: Dec. 20, 2011

(54) METHOD, SYSTEM AND USE THEREOF FOR CONTROLLING REAL TIME CONTIGUOUS DATA IN A PACKET SWITCHED DATA SYSTEM, REAL TIME CONTIGUOUS DATA SERVICE PROVIDED USING SAID METHOD (75) Inventors: Jos den Hartog, SE Capelle a/d Ijssel (NL); Rakesh Taori, Suwon (KR); Timothy Lee Ehrhart, Rijen (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 827 days.

(21) Appl. No.: 11/913,031

(22) PCT Filed: Apr. 29, 2005

(86) PCT No.: PCT/NL2005/000330
§ 371 (c)(1),
(2), (4) Date: Jun. 20, 2008

(87) PCT Pub. No.: WO2006/118439
PCT Pub. Date: Nov. 9, 2006

(65) Prior Publication Data
US 2009/0059931 A1 Mar. 5, 2009

(51) Int. Cl.
*H04L 12/28* (2006.01)

(52) U.S. Cl. .................................. 370/395.21; 370/468
(58) Field of Classification Search .................. None
See application file for complete search history.

(56) References Cited

U.S. PATENT DOCUMENTS

| 6,466,546 | B1 | 10/2002 | Tsukamoto |
| 7,046,680 | B1* | 5/2006 | McDysan et al. ............. 370/396 |
| 7,136,351 | B2* | 11/2006 | Metin et al. .................. 370/230 |
| 7,272,115 | B2* | 9/2007 | Maher et al. .................. 370/253 |
| 7,310,663 | B2* | 12/2007 | Bellinger et al. ............. 709/220 |
| 7,558,863 | B1* | 7/2009 | Sitaraman et al. ........... 709/228 |
| 2002/0002618 | A1* | 1/2002 | Vange .......................... 709/228 |
| 2004/0001493 | A1* | 1/2004 | Cloonan et al. ........... 370/395.42 |

* cited by examiner

*Primary Examiner* — Phirin Sam (57) ABSTRACT

The present invention relates to a method of controlling real time contiguous data in a packet switched data stream comprising data packages. Controlling of said real time contiguous data is performed by retaining data packages of said packet switched data stream for disturbing contiguousness of said real time contiguous data after receiving thereof. The invention further relates to a system for controlling said real time contiguous data the use of such a system in a packet switched data network, and a real time contiguous data service provided using a method as described above.

27 Claims, 4 Drawing Sheets

METHOD, SYSTEM AND USE THEREOF FOR CONTROLLING REAL TIME CONTIGUOUS DATA IN A PACKET SWITCHED DATA SYSTEM, REAL TIME CONTIGUOUS DATA SERVICE PROVIDED USING SAID METHOD

FIELD OF THE INVENTION

The present invention relates to a method of controlling real time contiguous data in a packet switched data stream comprising data packages.

The present invention further relates to a system for controlling real time contiguous data in a packet switched data stream using a method as described above, wherein said packet switched data stream comprises data packages, said system comprising an input for receiving said data stream and an output for transmitting said data stream.

The present invention also relates to the use of such a system in a packet switched data network, and to a real time data service provided using a method of the present invention.

BACKGROUND OF THE INVENTION

Broadband telecommunications solutions such as digital subscriber line (DSL) and/or other broadband cable connections (e.g. cable modem solutions) are widely used for providing IP-connectivity to a large public. Asynchronous digital subscriber line (ADSL) as an example, is a data communications technology that enables fast data transmission over regular copper lines such as subscriber lines for use with analog plain old telecommunications services (POTS). Also widely used are cable modem services, which are designed to modulate a data signal over cable television infrastructure providing broadband Internet access to users at home. In addition, wireless broadband telecommunications services are emerging fast, such as local multipoint distribution service (LMDS), multichannel multipoint distribution service (MMDS), worldwide interoperability for microwave access (WiMAX) and high performance radio metropolitan area network (HIPERMAN).

Most broadband services are sufficiently fast for providing not only fast internet connections but also real time contiguous data services. Examples of such services are voice over IP, online interactive gaming and other interactive services such as remote control of processes via a data network. Other services that may be considered involve streaming video and audio. Providing these services mostly requires a contiguous flow of data streaming between a sender and a receiver, in order to establish a signal comprising sufficient data and providing it at a rate sufficiently to keep up the quality. Since these services are often highly delay-sensitive, in this respect meaning that the data must be received shortly after sending thereof, they may be identified as real time services. Hereinafter, such services shall be referred to real time contiguous data services.

Most data communications services can be divided in four classes, e.g. as defined for universal mobile telecommunications system (UMTS) by 3GPP in 3GPP TS 23.107 v3.9.0 (September 2002)—"$3^{rd}$ Generation Partnership Project; Technical Specification Group Services and System Aspects; Quality of Service (QoS) concept and architecture (Release 1999)": conversational class, streaming class, interactive class and background class. These classes define the sensibility of data services to quality of service.

Conversational and streaming classes are mainly intended to be used to carry real time traffic flows, including most of the services described above. The main divider between conversational and streaming class is their sensitivity to delays in the data traffic. Both classes of services are sensitive to delay in the data traffic, however the required level of quality of service is determined by human perception in case of conversational class services.

Conversational class services include for example voice over IP and video conferencing. It is mainly characterized by the fact that real time conversation is performed between peers (or groups) of life (human) end users. Real time conversation scheme is characterized by that the transfer time shall be low because of the conversational nature of the scheme and at the same time that the time relation (variation) between information entities of the stream shall be preserved in the same way as for real time streams. The maximum transfer delay is given by the human perception of video and audio conversation. Therefore the limit for acceptable transfer delay is very strict, as failure to provide low enough transfer delay will result in unacceptable lack of quality.

Streaming class services include real time video and/or audio for example. When the user is looking at, or listening to, real time video or audio, the scheme of real time streams applies. The real time data flow is always aiming at a life (human) destination. It is a single one-way transport and is therefore not interactive. The streaming class service scheme is one of the newcomers in data communication, raising a number of new requirements in both telecommunication and data communication systems. It is characterized by that the time relations (variations) between information entities (i.e. samples, packets) within a flow shall be preserved, although is does not have any requirements on low overall transfer delay. The delay variation of end to end flow must be limited to preserve the time relation (variation) between information entities in the stream. But as the stream normally is time aligned at the receiving end (in the user equipment), the highest acceptable delay variation over the transmission media is given by the capability of the time alignment function of the application. Compared to conversational class. Acceptable delay variations are thus much greater than the delay variation given by the limits of human perception.

Interactive class service scheme applies when the end user, which may be either a machine or a human, is online requesting data from remote equipment (e.g. a server) for instance. Examples of human interaction with remote equipment are: web browsing, data base retrieval, server access, etc. Examples of machines interactions with remote equipment are polling for measurement records and automatic data base enquiries (telematics). Interactive class traffic is a data communication scheme that on an overall level is characterized by the request response pattern of the end user. At the message destination there is an entity expecting the message (response) within a certain time. Round trip delay time is therefore one of the key attributes. Another characteristic is that the content of the packets shall be transparently transferred (with low bit error rate).

The background class service scheme applies when the end user (typically a computer) sends and receives data files in the background. Examples are background delivery of e-mails, short message service (SMS), download of data bases and reception of measurement records. Background class traffic is a data communication scheme that on an overall level is characterized by that the destination is not expecting the data within a certain time. The scheme is thus more or less delivery time insensitive. Another characteristic is that the content of the packet shall be transparently transferred (with low bit error rate). As is clear from the above definition and description of the service classes (conversational class, streaming class, interactive class and background class), the conversational class and streaming class services are characterized by contiguously filling data from end to end. For conversational class services, the requirements are so strict that on a packet switched network, the data packages must be offered in their original order to the user of the conversational class service, without a noticeable interruption by the user. For streaming class services the requirements are less strict, but still the packages must be presented to the user in a streaming fashion without a noticeable interruption, and preferably shortly after the sending thereof.

On the other hand, interactive class and background class services may have requirements with respect to the time of arrival of data packages, however there is no requirement for data flowing contiguously and having to be presented in the streaming fashion having an unnoticeable interruption.

Summarizing the above for real time contiguous data services, these services may be divided in interactive (conversational class) service and non-interactive (streaming class) services. The interactive services require fast two-way communications with low overall delay and only limited variation in time of arrival of information entities. The non-interactive services mainly require limited variation in time of arrival of information entities, while a certain overall delay may still be acceptable. Voice over IP and video conferencing, or streaming audio/video may easily be divided in these two real time contiguous data service classes. It is noted that interactive multi-user gaming is typically is a conversational class service of which the transmission requirements are determined by human perception.

In view of the above and with respect to real time contiguous data services, it will be understood that the quality of service requirement for data connections for providing conversational class data services are more strict than for streaming class data services, and similarly, the quality of service requirement for data connections for providing streaming class data services are more strict than for interactive data services (including multi-user gaming). The background class services are the least sensitive to inferior quality of service.

At present, some conversational and streaming class real time contiguous data services are available but are not widely used by the public due to the fact that, although the quality of service of the broadband connections may be sufficient, internet performance is not sufficiently reliable to provide quality real time contiguous data services. It is however to be expected that as a result of continuous improvement of performance, the exploitation of real time contiguous data services to a large public is simply a matter of time.

Most data communications networks, including the internet, are packet switched data networks. Data which is to be sent via a packet switched data network is divided in data packages which are then sent out onto the network. In each network node, packages are forwarded to a next network node which is closer to the destination of the packet. Eventually, a packet arrives at its destination where it will be reassembled with other received data packages to provide the data collection that was originally sent, e.g. a data file. Networks of this type are also called datagram networks.

At transport level in the open system interconnection model (OSI-model), services are mostly provided using either transmission control protocol (TCP) or user datagram protocol (UDP). Real time contiguous data services belonging to conversational and streaming class are most often provided using the (more efficient) UDP protocol. UDP does not have a retransmission or resequencing mechanism. A packet received late is simply considered lost.

In particular, for real time contiguous data services, UDP is mostly used as the protocol within the transport layer, in combination with real time transport protocol (RTP) in the session layer and above the session layer in the presentation layer, real time streaming protocol (RTSP) is used to present the data stream to the application in the application layer. It is however noted that it may be possible to use TCP protocol for providing real time contiguous data services, instead of UDP. For example, this may be the case for multi-user online gaming.

Since UDP does not have re-sequencing or re-transmission mechanism, this may be provided in higher layers of the OSI-model. Amongst the tasks of RTP and RTSP, a re-sequencing mechanism may be provided for depending on the application. It will be understood that such a re-sequencing mechanism is optional, and may not provide any added value to the provisioning of some services.

Where the transport layer is responsible for end to end error recovery and flow control, it is the network layer in the OSI-model below the transport layer responsible for routing of the data packages. Therefore, in the network layer, the contents of a data package is transparent and each package comprises a header providing details regarding its destination (comparable to a regular postage system where packages comprise an address label but their contents is transparent to the courier).

In the data link layer of the OSI-model, below the network layer, data packages are encoded en decoded into bits. It is the data link layer which is responsible for the actual transmission of the data from a logical perspective. Below the data link layer in the OSI-model, there is the physical layer which is the lowest layer of the OSI-model, responsible for taking care of communication from a hardware perspective (multiplexing, cables, etc.). The data itself is completely irrelevant in the physical layer, since at this level the main requirement is to bring an electrical or optical signal from a first point to a second point and to a next point in the network.

The network managed by the network operator mainly operates within the lower three levels of the OSI-model: physical layer, data link layer and network layer. For more sophisticated tasks, it may be possible to operate on a higher level in the OSI-model, e.g. the transport layer.

For network operators (NO) and internet service providers (ISP), the data received via a broadband connection (such as an ADSL-connection or cable modem connection) which has to be sent via the internet to its destination, is therefore simply received as a stream of data packages without any meaning but having a destination. Each package has a header which enables forwarding the package to a next node closer to it's destination, but since the contents of the data packages is transparent at physical level, data link level, network level or transport level, the underlying data service associated with the data package is not known to the network operator or internet service provider.

This provides the disadvantage for the internet provider and network operator that it is difficult to distinguish the use of real time contiguous data services from the use of any other data service (such as regular web surfing, e-mail or other data services) within the data stream. It therefore becomes impossible to selectively provide conversational and/or streaming class services and other services with a real time contiguous character, such as online multi-user gaming, separately from any other internet services. A user ordering an ADSL-subscriber line or cable modem connection, as a result of the performance of this broadband connection, can use real time contiguous data services just as it can use any other data services provided that the user uses the necessary software and other premises. As a result, it is impossible for the network operator to provide these services separately to a user, and to charge the user for the use of these services.

SUMMARY OF THE INVENTION

It is an object of the present invention to resolve the above-mentioned disadvantages, and to provide means for enforcing agreed service level provisioning to users of a packet switched data network having a broadband connection.

This and other objects are achieved by the present invention in that there is provided a method of controlling real time contiguous data in a packet switched data stream comprising data packages, characterized in that, said control of said real time contiguous data comprises retaining of data packages of said packet switched data stream for disturbing the contiguousness of said real time contiguous data at presentation thereof to a receiving user.

It is to be understood that the retaining of data package leads to an overall delay of the data packages. Since for real time contiguous data services it is required that the data is presented in a streaming fashion, a delay caused by retaining of data packages may lead to interruption of the contiguous data associated with the real time contiguous data service. This will be the case if a sufficient number of packages is retained and/or are retained for a sufficient long duration of time. Such an interruption degrades the quality of the delivered real time contiguous data service, and enables a network operator or internet provider to enforce an agreed service delivery level, for example in case a user of the packet switched data network is not entitled to the use of real time contiguous data services.

It is noted that on one hand the above method provides the ability to degrade the quality of service of real time contiguous data services to such an extent that practical use thereof becomes almost impossible, while on the other hand a quality of service degradation in the delivery of non-real time data services, such as regular web surfing, e-mail or for example downloading of files, is hardly noticed by the user. In particular, conversational and streaming class services being most sensitive to degradation of quality of service, and services such as online multiuser gaming, may be affected to the extend that use of the service becomes impossible, since the quality of the received (reassembled) signal is very poor.

For example introducing a degradation of quality to the real time contiguous data services that will occasionally or on a regular basis introduce an interruption of the contiguousness of (for example) 10-100 milliseconds will be experienced as extremely annoying to someone who is trying to have a conversation via a voice over IP-service. On the other hand a delay of only a fraction of a second during the downloading of a file (being a background class service) or while a user is accessing a website (an interactive class service without a real time character), is hardly noticed if noticed at all and is as a result not experienced as annoying to the user. The above-mentioned method therefore provides an effective way of distinguishing between real time and non-real time services for enforcing an agreed service level in an environment where the contents of the data in the data stream is not known or irrelevant to the network provider.

According to an embodiment of the invention, said data packages are retained for a period of time and returned to said data stream after retaining.

It will be understood that by returning the data packages after retaining thereof, they will be received eventually by the receiving user. This will in particular be beneficial to non-real time contiguous data sent using TCP protocol or using UDP protocol in combination with a re-transmission or re-sequencing mechanism taking place on a higher level in the OSI-model. TCP includes a re-transmission sequence based on a sliding window principle. If a packet is not received within a certain period of time after it is expected to be received (a window sliding along with the expected time of arrival of a packet), re-transmission of the packet is requested. If however the packet is delayed, but is received within the sliding window of time after the expected time of arrival, re-transmission will not be requested. In this case, re-transmission of a packet is not required if the packet is received late but still early enough before re-transmission is requested by the receiving party.

On the other hand re-transmission is often irrelevant for real time contiguous data services. Firstly, conversational and streaming class services are often provided based on UDP which does not include re-transmission. A lost packet is simply considered lost. Re-transmission might optionally take place, but not necessarily. Secondly, re-transmission is often not an option for real time contiguous data services, since in a case where a data package or data frame is lost and the data packages would be retransmitted it would be received too late to present it to the receiving user. Therefore for real time contiguous data services re-transmission of packages in case of package loss is often not performed, not even on a higher level (above transport level).

In case a data package is retained and not returned to the data stream, for the real time contiguous data service the data package is simply lost (UDP), while for the non-real time data services a re-transmission of the package is requested (TCP) slowing down the transfer rate of the data. If the data package is retained and returned to the data stream after being retained for a certain period of time, for the real time contiguous data service based on UDP it is still considered lost, thereby still causing the same extent of degradation of the service. On the other hand for non-real time data based on TCP, the package may be received (just) in time (e.g. within the sliding window) to make re-transmission unnecessary. As will be understood this provides performance benefits for the non-real time data being transferred across the packet switched data network. It is noted that even if a real time service would be provided based on TCP, a re-transmission would not improve the quality of the service in this case and it might even deteriorate the quality, since the packet cannot be invoked anymore in the data stream without introducing a delay.

According to another embodiment of the invention, retaining said data packages, comprises retaining a plurality of subsequent data packages in said data stream. It will be understood that the retaining of a group of subsequent data packages will result in an interruption of the contiguousness of real time contiguous data, even in case a buffer would be used to collect all data packages before presenting them to the receiving user.

If no buffer is used, the occurrence of an interruption of the contiguousness of the data is obvious, since the data packages are simply received too late. If however a buffer or any other means of correction is used and a sufficient amount of subsequent data packages is retained, this would provide degradation of the real time contiguous data services that cannot be resolved in time to present the data in a contiguously streaming fashion to the receiving user, therefore, even with the use of a buffer or any other means of correction, the method according to this embodiment will introduce an interruption of the contiguousness of the data.

According to another embodiment of the present invention, the retaining of data packages comprises retaining of one or more randomly selected data packages of the data stream.

By retaining one or more randomly selected data packages from the data stream small interruption of the data stream are introduced. In case no means of correction at the receiving side is used, this will be experienced as noise or an annoying 'breaking-up' of the received contiguous data. If any means of correction such as a buffer is used at the receiving side, the received data associated with the real time contiguous data service is delayed for a certain period of time until the required packages are received or until the means of correction considers the packages to be lost and presents the data without the received packages. In each case, this will result in an annoying degradation of service if a sufficient amount of data packages is retained for a sufficiently long time.

An alternative way of introducing a degradation of service for real time contiguous data services is achieved with an embodiment of the present invention, wherein the real time contiguous data comprises a sequence of data packages, and wherein the data packages of data stream are retained for rearranging the sequence of data packages.

Here it is brought in mind that the retaining of data packages according to the invention takes place on all data packages in the data stream, regardless of whether these data packages are associated with real time contiguous data services or with non-real time contiguous data services. By retaining one or more data packages of the data stream, the original order of the data packages in the data sequence is disturbed if the retained data packages comprise data packages of the sequence. If this is not corrected at the receiving side this will be experienced again as noise or a 'breaking-up' of the data. However if corrected at the receiving side it may result in a delay of the presentation of data leading to the interruption of the contiguousness of the data. In other words, the data cannot be presented in the contiguously streaming fashion to the receiving user. For non-real time data services the order in which the packages is received is repairable upon receipt, such that the method according to this embodiment of the present invention will not be annoying nor cause a noticeable degradation of service for non-real time data services.

According to a modification of the above-mentioned embodiment, the data packages are retained and returned to the data stream with different retaining time for each retained data package or group of retained data packages.

This will provide an effective method of rearranging all of the data within the data stream. The length of the retaining time may, for example and according to another embodiment, be determined randomly.

According to another embodiment of the present invention the packet switched data stream is an outbound data stream from a data transmitter, while according to yet another embodiment of the invention, the packet switched data stream is inbound data stream to a data receiver. Any of these options, or both in combination, may be applied.

It will be understood that both embodiments provide benefits for the use of the method of the present invention, since agreed service level enforcement may take place on both incoming traffic to a user as well as outgoing traffic from a user of the packet switched data network.

According to another embodiment of the present invention the method further comprises a step of reassembling the data packages after receipt thereof by the receiving user. As already to some extent discussed above, the availability of a means of correction at the receiving side will not overcome the service degradation presented by the method of the present invention, and in most cases even increase the degradation of service thereof. It is noted that, for example, when a buffer is used to correct the received time critical or real time contiguous data this may lead to an even larger interruption of the contiguousness of the data upon presentation compared to a situation where no correction takes place at the receiving side. This is due to the fact that the buffer will retain all subsequent data until the lost data is received, or if it is not received, present the data delayed after having waited for the lost data to be received.

According to a modification of the above-mentioned embodiment the step of reassembling comprises buffering said data packages as received, and discussed above.

According to yet another modification of the above embodiment, the step of reassembling further comprises a step of rearranging the received data packages in an original order in which the data packages were originally transmitted.

Although the method of the present invention can be performed at any desired level of the open system interconnection model (OSI-model), according to an embodiment of the present invention the method of the present invention preferably is performed in a packet switched data network at any level of a group comprising data link level, network level or transport level. It will be understood that at these levels the data in the data stream is transparent to the network topology, and only its structure in the form of data packages is visible.

Application of the invention at data link level has the benefit that it is performed on a low level in the network, and it can be applied without the necessity of analysing or interpreting the packages to any extend. The method of the present invention may in this case be implemented relatively easy, and can be performed very fast.

Application of the invention at network level has the benefit that at this level routing information is available. Therefore, selective retaining of packages based on their destination or origin is then possible.

Application of the invention at transport level provides the benefit of being able to selectively retain packages transmitted using a certain protocol (UDP or TCP), or alternatively selectively retaining packages having a specific TCP/UDP port number. By retaining packages having a specific port number, specific services can be targeted which are associated with a said port.

According to another embodiment of the present invention the real time contiguous data is used for providing real time contiguous data services, such as telephony or streaming multi-user gaming.

According to another embodiment of the present invention retaining of said data is performed dependent on an authorisation status for use of the real time contiguous data services as mentioned above. This will enable the performance of the method of the present invention dependent on e.g. the agreed service level or any other criterium applicable to the user. It is noted that instead the method may also be used for a general on-purpose blocking of the use of real time contiguous data services for all users.

According to a modification of the above-mentioned embodiment the authorisation status is established by evaluating identification data provided by a user of the real time contiguous data services.

It will be understood that it may be possible to carry out an identification sequence, or similar for the granting of access to real time contiguous data services, and determine the authorisation status from the outcome of the identification sequence. It may be required for the user to enter a username and password such as to identify him as a user being qualified for using the real time contiguous data services.

Based on the outcome of the evaluation of the identification data, service delivery of real time contiguous data services may temporarily be allowed to the user.

According to another embodiment thereof, the service level is registered for the data stream as a whole, and the authorisation status is determined by the registered service level. It will be understood that for instance the method can be performed on all data coming from a certain user of whom it is known that he/she is not entitled to use the real time contiguous data services. The retaining of data packages can for example be carried out on all data being transferred across the broadband connection or ADSL-connection used by the user.

According to another embodiment the packet switched data stream is transported using subscriber line of a telecommunications network. With the use of subscriber lines the authorisation status is determined by the subscription conditions and can or may be registered as such. A subscriber line solution may include at least any of the following: digital subscriber line (DSL), such as an asymmetric digital subscriber line (ADSL), a symmetric digital subscriber line (SDSL), a rate adaptive digital subscriber line (RADSL), a high bit-rate digital subscriber line (HDSL) or a very high bit-rate digital subscriber line (VDSL), cable modem solution, satellite internet, frame relay, gigabit ethernet, any wireless broadband subscriber solutions such as local multipoint distribution service (LMDS), multichannel multipoint distribution service (MMDS), worldwide interoperability for microwave access (WiMAX), high performance radio metropolitan area network (HIPERMAN), or another broadband subscriber line solution.

According to another embodiment of the present invention the real time contiguous data services comprises at least one of a group comprising telephony, such as voice over IP, streaming multi-user gaming, streaming video and streaming audio. It is noted that the use of the method according to the present invention is not limited to these services.

According to a second aspect of the present invention there is provided a system for controlling real time contiguous data in a packet switched data stream, wherein said packet switched data stream comprises data packages, said system comprising means for intercepting and forwarding said data stream, characterized in that, said system further comprises means for retaining data packages of said packet switched data stream for disturbing contiguousness of said real time contiguous data after presentation thereof to a receiving user.

Embodiments of this second aspect of the present invention are defined in dependent claims 23-32.

Note that according to a preferred embodiment of the invention, the system comprises means for determining the authorisation status of a user. These means for determining the authorisation status may comprise means for receiving the authorisation status from an external source, in accordance with yet an another embodiment thereof. These means for determining the authorisation status may however also comprise means for receiving and evaluating identification data provided by a user.

According to a third aspect of the present invention, the invention is related to the use of a system as described above in packet switched data network for controlling real time contiguous data traffic in said network for providing real time contiguous data services. In accordance with embodiments of this aspect, the system may be arranged for controlling either inbound, outbound or both types of real time contiguous data traffic to a receiver, from a transmitter, or to and from a transceiver respectively.

The services provided according to the use defined above, may comprise telephony, streaming multi-user gaming, streaming video or streaming audio or any other real time contiguous data service.

According to fourth embodiment of the present invention, the invention is related to a real time contiguous data service such as telephony, streaming multi-user gaming, streaming video or streaming audio, wherein said service is provided using a method as defined herein above, wherein the real time contiguous data service is provided using the real time contiguous data as defined above.

The present invention will now be further elucidated by a description and drawings referring to preferred embodiments thereof. The invention is however not limited to the embodiments disclosed, which are provided for explanatory purposes only. The scope of protection of the present invention is clearly defined in the appended claims.

DETAILED DESCRIPTION OF THE FIGURES

Figure 1:
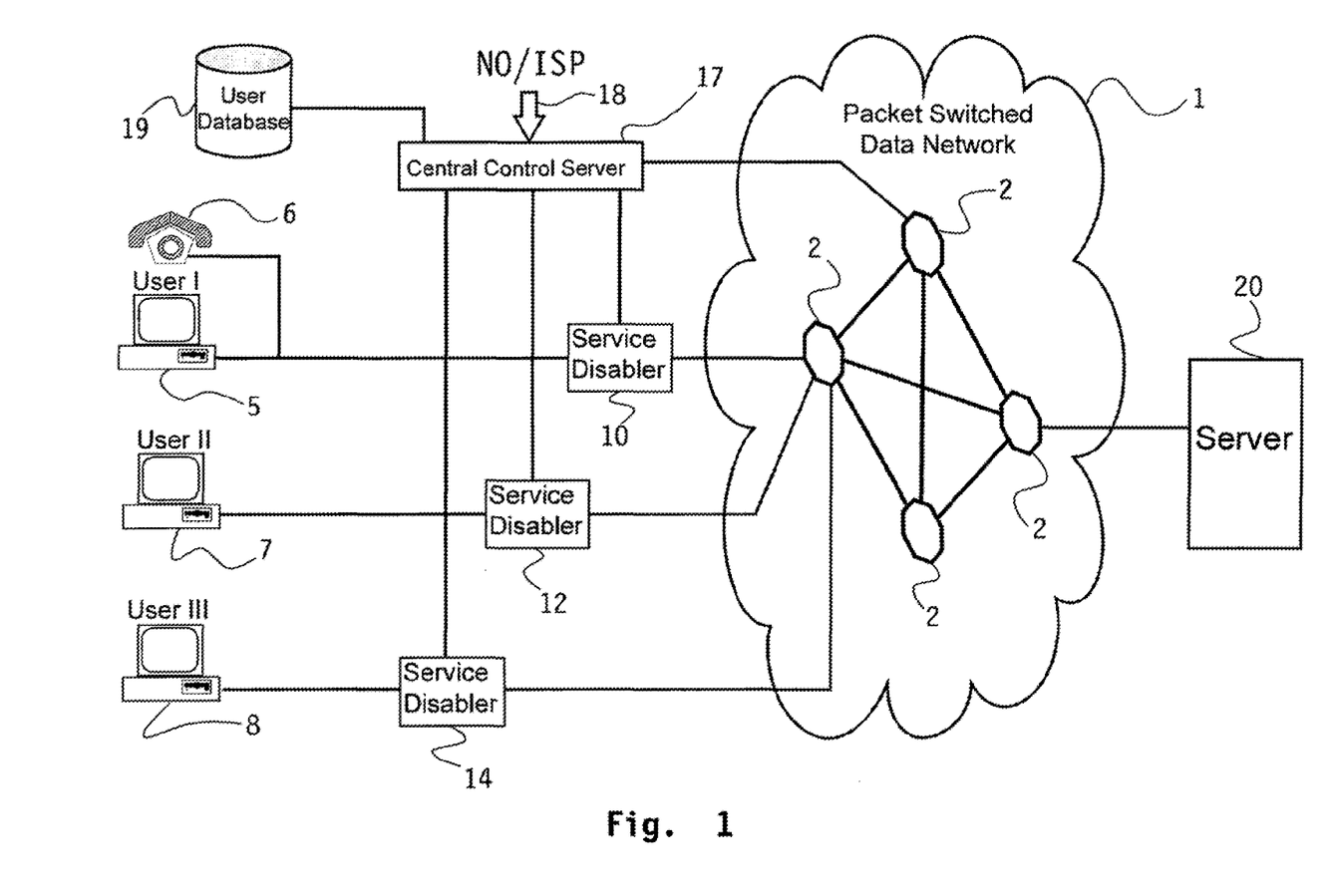
FIG. 1 is an illustration of a packet switched data network wherein a real time contiguous data service disabler according to the present invention is used.

In FIG. 1, a plurality of users is connected to a packet switched data network 1 using a variety of data sources or transmission means such as an internet telephone 6 and personal computer 5 of user I, a personal computer 7 of user II, and a personal computer 8 of user III. The packet switched data network is schematically illustrated by a cloud 1 and by the plurality of interconnected network nodes 2. Each of the users I, II and III is connected to one of the nodes 2 of the packet switched data network 1. Packet switched data network 1 may comprise, for example, the internet. A variety of data services is accessible on the customer premise equipment 5, 6, 7 and 8 of users I, II and III via packet switched data network 1. These data services may include e-mail, web surfing, file transfer and real time contiguous data services such as voice over IP, video conferencing, interactive multi-user gaming, digital television, internet radio, streaming audio and streaming video.

A digital television program may be broadcasted using server 20 connected to packet switched data network 1 as well. This digital television broadcasting may potentially be received by any of the users via, for example, personal computers 5, 7 and 8. Another possibility is that user I, using his digital internet telephone 6, wants to set up a call with user III via his personal computer 8.

In the packet switched data network schematically illustrated in FIG. 1, each of the users I, II and III is connected to the network through (amongst others) a system according to the present invention, hereinafter called a real time contiguous data service disabler. For example user I is connected to service disabler 10 which is connected to network node 2. Likewise, users II and III are connected to network node 2 through service disablers 12 and 14 respectively. Each of the real time contiguous data service disablers 10, 12 and 14 may be controlled via a central control server 17 over which the network operator or internet service provider has full control as schematically indicated by arrow 18.

Suppose user I is connected to the packet switched data network through a broadband connection (e.g. a digital subscriber line connection (DSL)) having a subscription which corresponds to the highest service level provided by the internet service provider. User I is therefore not only entitled to use regular data services such as web surfing, e-mail and the like, but is also entitled to use real time contiguous data services such as voice over IP or video conferencing. In addition, suppose user III is also connected to the packet switched data network via a DSL subscriber line, having a same subscription as user I. At the same time, user II is also connected with the packet switched data network through a broadband connection, only having a subscription corresponding to the lowest service level available since he is only interested in e-mail and web surfing.

Given the subscriptions as described above the network operator or internet service provider may program each of the real time contiguous data service disablers correspondingly via control server 17. The network operator may for example enable all services available for users I and III, by switching off service disablers 10 and 14. At the same time the network operator, via control server 17, may program service disabler 12 not to allow any real time contiguous data service.

If user I wants to set up a voice over IP telephone call with user III, using his internet telephone, his spoken voice is translated into a sequence of data packages originating from internet phone 6, which is included in a data stream heading for service disabler 10. Since service disabler 10 is switched off, the data stream is forwarded unamended to network node 2 from where it is forwarded to personal computer 8 of user III. On its way to personal computer 8, the sequence of data packages destined for user III is ignored by service disabler 14 since it is also switched off. User III will be notified of user I's incoming call and answers the incoming call. A conversation takes place.

For user II, the service disable 12 is set up such that the extent of service degradation on incoming and outgoing data traffic is such that no real time contiguous data service can be used. If user II wants to set up a voice over IP-call with user I or user III, a sequence of data packages corresponding to spoken voice of user II is forwarded to service disabler 12, however service disabler 12 retains a sufficiently large number of packages for a sufficiently long time such that interruptions of the contiguous data signal are introduced on a regular basis at the receiving side (e.g. user I or user III), and cannot be corrected using normal correction means without the interruption. Vice versa, real time contiguous data services received by user II are affected likewise by the service disabler 12. At the same time, the television program broadcasted by service 20 cannot be received by user II, without unacceptable service degradation.

Suppose that user I visits to user II and while using the customer premise equipment of user II (personal computer 7), user I and user II want to set up an internet telephone call with user III. As described above, service disabler 12 is configured by the network operator or internet service provider such that no real time contiguous data service is possible for personal computer 7 using the broadband connection with the packet switched data network. It is however noted that control server 17 is connected to the packet switched data network. It may be possible to provide real time contiguous data services on a temporal basis through service disablers 12 to personal computer 7 as will be described below.

For setting up the internet telephone call using personal computer 7, user I, e.g. by accessing a website, connects to control server 17 where he is confronted with an identification procedure. User I may enter his username and a password, and during an evaluation process control server 17 checks whether this username and the corresponding password exist, and dependent on the result of this check connects to data base 19 comprising all connection details for all users connected to the packet switched data network via the above-mentioned internet service provider. The network control server determines that user I is entitled to use internet telephony on the basis of his subscription conditions. In response, control server 17 now temporarily switches off service disabler 12, and users I and II using personal computer 7 may now set up an internet telephone call with user III. As soon as the internet telephone call is terminated, the internet service provider may re-establish the original service level to which user II is entitled.

Suppose that user III now changes his broadband subscription, since he is not interested anymore in receiving voice over IP. Since he does not want to miss his favourite streaming video weekly internet TV program, he switches to a lower service level enabling streaming video but no conversational class contiguous data services such as video conferencing or voice over IP. The network operator (NO) or internet service provider (ISP) will now switch on service disabler 14 and configure it such that with a random sequence data packets in the outgoing data stream are delayed for a randomly chosen period of time.

Suppose that user I now wants to set up a video conferencing call with user III. Again, but now using his personal computer 5, a microphone (not shown) and a web cam (not shown) the spoken voice and images of user I will be transformed to a sequence of data packages which is forwarded to service disabler 10. Service disabler 10 is switched off, and the sequence of data packages is forwarded to network node 2, from where they are forwarded to service disabler 14 on the broadband connection of user III. Service disabler 14 ignores incoming traffic, so user I data signal is transmitted unamended to personal computer 8 of user III.

In return, upon responding to remarks made by user I, a data stream carrying user III's voice and image leaves personal computer 8 and is intercepted by service disabler 14. Service disabler 14 occasionally but on a regular basis retains data packages from the data stream coming from personal computer 8. User I receives a data stream on his personal computer 6 which misses data packets on a regular basis. Since the quality of service required for video conferencing requires a high standard, the service degradation introduced by service disabler 14 causes interruptions of the contiguousness of the data received by user I at personal computer 6. The service degradation caused is such that even with use of correction means such as a buffer, the contiguousness of the data is regularly interrupted and the conversation between user I and III is not really possible. User III cannot use video conferencing, nor can he make use of voice over IP for the same reason.

Suppose further that after a while, user III again changes his subscription since he wants to be able to broadcast streaming video. The ISP may configure service disabler 14 such that occasionally but on a regular basis one or more packages from the total outgoing data stream are retained. This deteriorates the quality of service to such an extent that conversational class services will be affected such that use thereof becomes impossible, but the quality of service for streaming class services is still sufficient in order to make use of these services.

If user III now tries to call user I using his computer 8, the outgoing data traffic is intercepted by service disabler 14. Service disabler 14 is switched on, and has been set up by the network operator in such a way that, for example, occasionally but on a regular basis one or more packages from the total outgoing data stream are retained by the service disabler 14. This retaining will unavoidably affect the data packets comprised by the sequence of data packages originating from user III. After being retained for a certain period of time, the packages are forwarded to network node 2 from where it is forwarded to internet phone 6 of user I. Internet phone 6 may for example comprise an element for buffering data packages received. After being buffered for a certain period of time the data packages are reassembled in their original sequence order such that they may be presented to user I which will experience the data as spoken voice from user III but heavily disturbed or constantly 'broken up'. Regular conversation is not possible and the conversation will come to an early end. It is noted that in order to be able to correct and reassemble the data packages, either the number of packages to be retained must be sufficiently small or these packages must be retained only shortly, short enough to cause an overall delay which is not noticed or not experienced as annoying to user I during a voice over IP call. If service disabler 14 is configured well, delaying a sufficient number of outgoing packets sufficiently long, effective 'scrambling' of the voice signal will occur.

Streaming video is affected to the same extent, but since a small overall delay can be recovered for these services, a buffer can be used to together with a recovery procedure to reestablish the correct data sequence order.

It will be understood that for users having an ADSL connection, the invention may be applied at a first network node taking up all data coming from said user, in FIG. 1 this is in or near node 2. Service disablers 10, 12 and 14, although in FIG. 1 depicted as being separate components in the network, may be integrated with network node 2 in case of e.g. DSL connections.

The embodiment described in relation to FIG. 1 has been described in relation to a digital subscriber line (DSL) solution, wherein each user is connected to network node 2 with a separate connection. A complication arises when the invention is applied to e.g. a cable modem solution, for which a number of users share a single connection to a network node in a local loop. This is depicted in FIGS. 4A and 4B and will be described below.

Figure 4A:
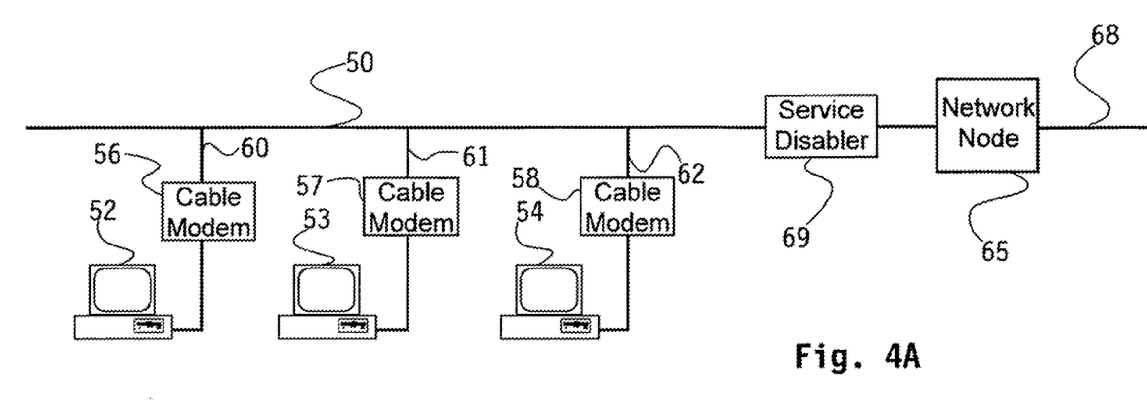
FIGS. 4A and 4B are schematic drawings of two alternative embodiments of the invention implemented in a cable modem solution.

For application of the invention in combination with cable modem solutions, it will be understood that each user 52, 53, 54 of FIG. 4A, connects to a network node 65 via a shared connection 50 with other users. For example a number of users 52, 53, 54 living in each others neighbourhood, e.g. within the same street, may be connected via a single connection 50 to the network node 65 using cable modems 56, 57, and 58 respectively. Network node 65 is comprised by a wide area network (WAN) connecting with other nodes (not shown) via connection 68. Each of the users 52, 53 and 54 is connected to the shared connection 50 via private connections 60, 61 and 62 respectively.

Simply retaining data packages comprised in the data stream on the shared network connection 50 (e.g. as described above in relation to the embodiment shown in FIG. 1) would affect every user connected to that network connection 50 and would therefore not be suitable for user dependent policy enforcement or service provisioning. For cable modem solutions a number of options is possible. On data link level each cable modem (56, 57, 58) can be recognized by a media access control (MAC) address. It is therefore possible to include a step of recognition of the data package by its originating or destinating MAC address. Once a data package is recognized as belonging to a certain MAC address, the destined or originating user is known and data packages marked with the MAC address of that user may be retained without affecting data packages of other users. In FIG. 4A this is performed by service disabler 69, performing a step of MAC address detection for each package at data link level. Once the data packages to be retained are identified, service disabler 69 will perform a suitable retaining method as is described above e.g. in relation to service disablers 10, 12 and 14 of FIG. 1.

Figure 4B:
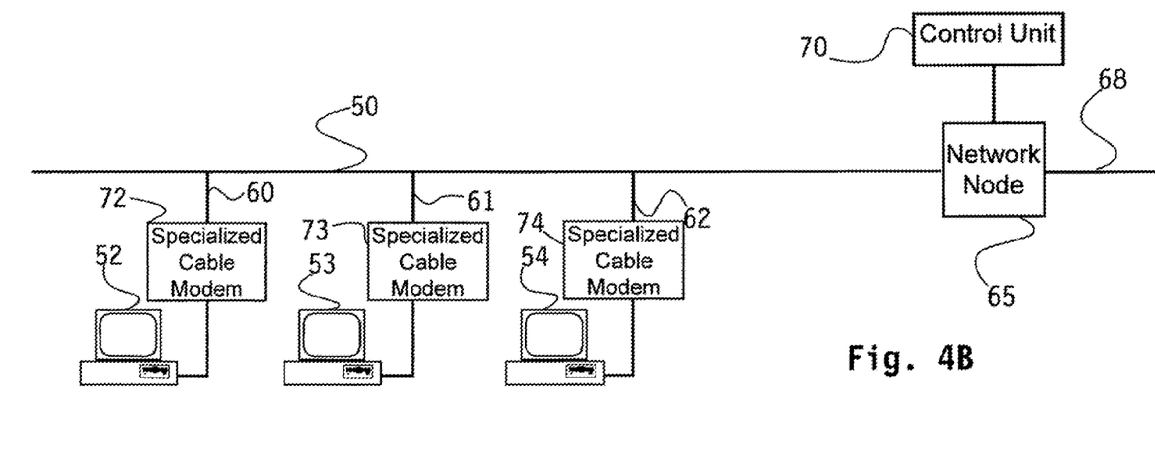

A second solution is depicted in FIG. 4B, wherein all elements in the embodiment shown which have not been amended and/or are functioning in the same manner as in FIG. 4A have received the same reference numbers. The difference between FIGS. 4A and 4B is the use of specialized cable modems 72, 73 and 74 by users 52, 53 and 54 respectively. These specialized cable modems 72, 73 and 74 are remotely programmable by the network operator or internet service provider, e.g. using control unit 70. Service disabling or data package retaining by these specialized cable modems 72, 73 and 74 may for instance include a step of retaining inbound or outbound data packages destined for or originating from the associated user. The programming of these cable modems makes the use of a service disabler, such as service disabler 69 of FIG. 4A, obsolete.

Figure 2:
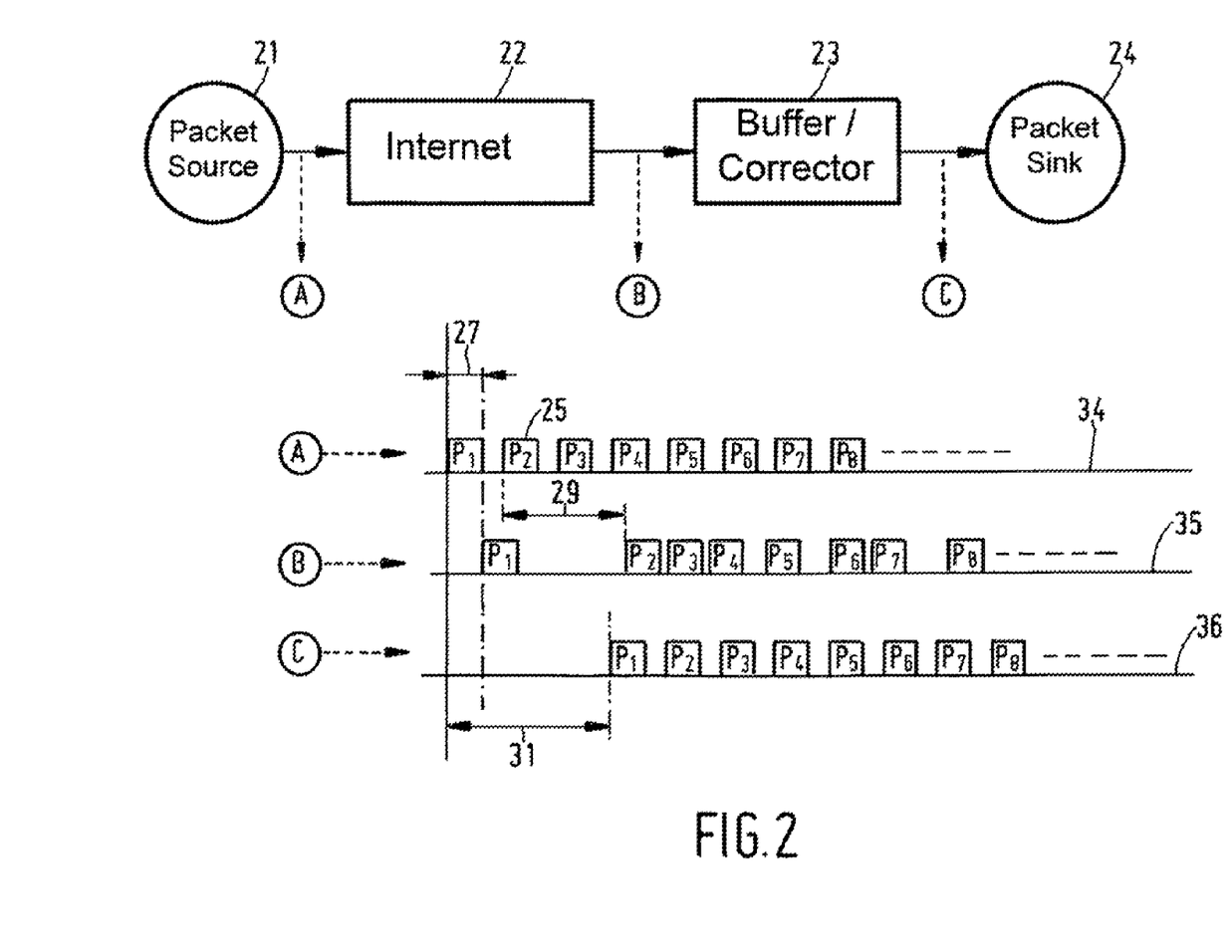
FIG. 2 shows a traffic delivery pattern for a sequence of data packets transmitted through a packet switched network.

FIG. 2 shows a packet delivery pattern for a sequence of data packages delivered through a packet switched network, such as the internet. The sequence of data packages origins from a packet source 21, from which they are transmitted onto the internet 22, and upon receival by a receiving party, a buffer or correction means 23 reassembles the received packages and places them in their original sequence order. After that, the data is presented to the user as indicated by packet sink 24. In FIG. 2, the traffic pattern of packets is analysed in each of the locations A, B and C, corresponding to the sequence of data packages provided by packet source 21 to the internet 22 (situation A), the same sequence as received by the buffer 23 after the sequence has traveled the internet 22 (situation B), and again the same sequence as presented by the correction means or buffer to the user schematically indicated by packet sink 24 (situation C).

Figure 3:
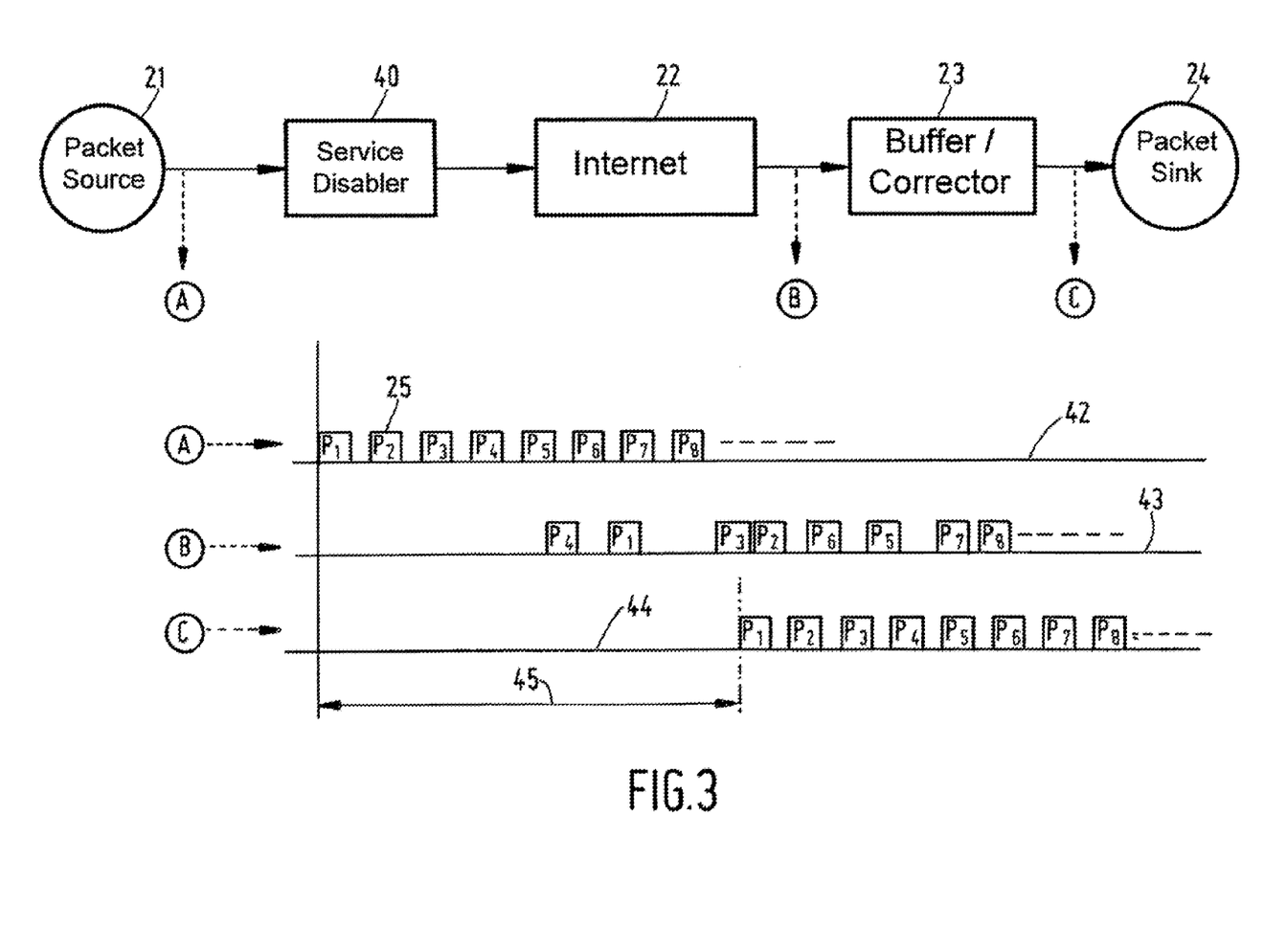
FIG. 3 shows a traffic delivery pattern for the transmission of a sequence of data packages over a packet switched data network comprising a real time contiguous data service disabler according to the present invention.

The packet sink, as indicated for A, provides a sequence of packages at regular time intervals in the following order: P1, P2, P3, P4, . . . . Given the nature of a packet switched data network such as the internet, where different packages of the same sequence may travel from one location to another location via different network nodes, the temporal ordering of the packages may be disrupted to some extent. In general, an internet channel between a first and a second location may be characterised statistically. It is often possible to comment on the minimum and maximum travel duration for packets in respect of their journey across the internet channel. At the earliest, a packet is received 'directly' (or very shortly after) it was sent such as packet P1, in FIG. 2. The minimum duration is indicated by double arrow 27 above axis 34. Statistically, some packages have a maximum travel duration as indicated for package P2 by double arrow 29 right above axis 35 for situation B. Given these properties of the internet channel, it is possible for a receiver to correct the sequence of data packages and obtain a constant pay-out rate by buffering packets for a certain period of time as indicated by double arrow 31. After that, the packets are presented to the user in a regular streaming fashion as indicated in situation C, but with only a small delay. If the duration of buffering is sufficiently small the receiving user in packet switch 24 will hardly notice the delay and will experience the presented data as e.g. spoken voice. In FIG. 3, almost the same network implementation is illustrated as in FIG. 2, however in FIG. 3 use is made of an real time contiguous data service disabler 40 under connection between the packet source 21 and the internet 22. It is noted that similar features shown in FIG. 3 are indicated with similar reference numbers as in FIG. 2. On axis 42, the sequence of data packages such as data package 25, as provided by the packet source 21 is illustrated. Service disabler 40 may retain each of the packages transmitted and retain each packet for a different duration of time until returning if again to the data stream. As a result, since for example package number P4 will be retained much shorter than package P1, the original order of the sequence is completely disrupted by the service disabler 40. This adds on to the disruption already caused by the internet 22, and generates a package receipt pattern as indicated for location B, on axis 43. If buffer 23 wants to place the received packages in the appropriate fashion, a very long delay must be introduced as indicated by double arrow 45. Such a long delay may be experienced by the receiving user as an interruption of the contiguousness of the data, and since these interruptions may take place on a regular basis, it is experienced by the user as annoying. It will therefore from a practical point of view be difficult for the user to use the real time contiguous data services. Access to the service can therefore effectively be denied. It is in particular noted that the delay introduced by service disabler 40 for each data packet may be the result of a random shift which is applied to all of the incoming packets. Each of the packets may be shifted, for example, −3, −2, −1, 0, 1, 2 or 3 places such as to destroy the original order of the packets in data stream.

Since the sequence of data packages represents spoken voice, the packets must be buffered and reassemble in their original order. This causes the delay indicated by double arrow 45. It is in particular noted that if the data packages represented on axis 42 for situation A constitute a web page, it will not really be relevant which package is delivered first and which is delivered last. Different parts of the web page may already start loading independent of other parts of the web page, and the rearranging of data package is not or not likely experienced as annoying.

A similar effect is true for, e.g. the downloading of a file. The introduction of a small delay in the receiving of a file as a result of the reassembling of the data packages will not be considered annoying to the user downloading the file, since it does not have to be presented in a contiguously streaming fashion. A late received package may, without any problem, be inserted in between the already received package. Once the file is downloaded it is there, whilst for spoken voice an interruption of the contiguousness causes interpretation of a conversation to become very difficult or even impossible.

It is noted that if the method is performed on traffic based on a TCP-protocol (transmission control protocol—TCP) having a sliding window, the through-put would be slowed down equivalent to the amount of introduced delay. Since it is expected that real time protocols (speech, video) will more and more be based on UDP (user datagram protocol—UDP) having no sliding window, the method of the present invention will in particular be effective for UDP-based services, since an interruption of transmission will occur directly after a package is not received. It is noted that UDP is much more dependent on quality of service than TCP.

For the purpose of comprehensiveness it is noted here that numerous modifications and variations of the present invention are possible in the light of the above teachings. It is therefore understood that, within the scope of the appended claims the invention may be practised otherwise than as specifically described herein.

The invention claimed is:

1. A method of controlling real time contiguous data in a packet switched data stream having a first Quality of Service (QoS) level, the packet switched data stream comprising a plurality of contiguous data packages, the method comprising the steps of:
    modifying the packet switched data stream to provide a different, second QoS level by extracting by a service disabler node, selected data packages from the packet switched data stream depending on an authorization status of a receiving user for utilizing real time contiguous data services; and
    forwarding from the service disabler node to the receiving user, the modified packet switched data stream with the different, second QoS level.

2. The method according to claim 1, further comprising:
    retaining said extracted data packages for a period of time and returning the extracted data packages to said data stream after said retaining.

3. The method according to claim 1, wherein said real time contiguous data comprises a sequence of data packages, and wherein said data packages of said data stream are retained for rearranging said sequence of data packages.

4. The method according to claim 3, wherein said data packages are retained and returned to said data stream with a different retaining time for each retained data package or group of retained data packages.

5. The method according to claim 3, wherein the length of said retaining is randomly determined.

6. The method according to claim 1, wherein said packet switched data stream is an outbound data stream from a data transmitter.

7. The method according to claim 1, wherein said packet switched data stream is an inbound data stream to a data receiver.

8. The method according to claim 1, further comprising:
    reassembling of said data packages after receipt thereof by said receiving user on one of a transport level, a session level, a presentation level, and an application level, said reassembling step including:
    buffering the received data packages; and
    rearranging the received data packages in an original order in which the data packages were originally transmitted.

9. The method according to claim 1, wherein the extracting of data packages is performed in a packet switched data network on one of a data link level, a network level, and a transport level.

10. The method according to claim 1, wherein said real time contiguous data is used for providing said real time contiguous data services, including telephony streaming, multi-user gaming, streaming video, and streaming audio.

11. The method according to claim 1, wherein said authorization status is established by evaluating identification data provided by a user of said real time contiguous data services, and checking subscription information of the identified user.

12. The method according to claim 1, wherein a service level is registered for said data stream, and wherein said authorization status is determined by said registered service level.

13. The method according to claim 1, wherein said packet switched data stream is transported on a subscriber line of a telecommunications network.

14. The method according to claim 13, wherein said subscriber line is one of a group comprising:
    a digital subscriber line (DSL), including asymmetric digital subscriber line (ADSL), symmetric digital subscriber line (SDSL), rate adaptive digital subscriber line (RADSL), high bit rate digital subscriber line (HDSL), and a very high bit-rate digital subscriber line (VDSL),
    a cable modem solution, a satellite internet frame relay,
a gigabit Ethernet connection, or
a wireless broadband subscriber solutions including local multipoint distribution service (MMDS), multichannel multipoint distribution service (MMDS), worldwide interoperabilty for microwave access (Wi MAX), and high performance radio metropolitan area network (HIPERMAN).

15. A service disabler node for controlling real time contiguous data in a packet switched data stream having a first Quality of Service (QoS) level, wherein said packet switched data stream comprises a plurality of contiguous data packages, wherein the service disabler node is configured to:
   intercept the data stream prior to receipt by a receiving user;
   modify the packet switched data stream to provide a different, second QoS level by extracting selected data packages from the packet switched data stream depending on an authorization status of a receiving user for utilizing real time contiguous data services; and
   forward to the receiving user, the modified packet switched data stream with the different, second QoS level.

16. The service disabler node according to claim 15, wherein the service disabler node is also configured to retain the extracted data packages for a period of time, and to return the extracted data packages to said data stream when the period of time expires.

17. The service disabler node according to claim 16, wherein the service disabler node is further configured to retain each of the extracted data packages or groups of data packages, for different periods of time.

18. The service disabler node according to claim 17, wherein the service disabler node is further configured to randomly set the different periods of time.

19. The service disabler node according to claim 15 wherein the service disabler node is further configured to extract a plurality of subsequent data packages.

20. The service disabler node according to claim 15, wherein the service disabler node is further configured to randomly extract one or more data packages.

21. The service disabler node according to claim 15, wherein said real time contiguous data services are associated with said real time contiguous data.

22. The service disabler node according to claim 15, wherein the service disabler node is also configured to determine the authorization status of the receiving user.

23. The service disabler node according to claim 22, wherein the service disabler node is further configured to receive the authorization status from an external source.

24. The service disabler node according to claim 22, wherein the service disabler node is further configured to determine the authorization status by receiving and evaluating identification data provided by the receiving user.

25. The service disabler node according to claim 22, wherein the service disabler node is further configured to determine the authorization status from a service level defined for said data stream.

26. The method according to claim 1, wherein the extracting step includes extracting a plurality of subsequent data packages from the data stream.

27. The method according to claim 1, wherein the extracting step includes extracting one or more randomly selected data packages from the data stream.

* * * * *

UNITED STATES PATENT AND TRADEMARK OFFICE
CERTIFICATE OF CORRECTION

| | | |
|---|---|---|
| PATENT NO. | : 8,081,636 B2 | Page 1 of 1 |
| APPLICATION NO. | : 11/913031 | |
| DATED | : December 20, 2011 | |
| INVENTOR(S) | : den Hartog et al. | |

It is certified that error appears in the above-identified patent and that said Letters Patent is hereby corrected as shown below:

In Column 17, Line 6, in Claim 14, delete "interoperabilty" and insert -- interoperability --, therefor.

In Column 18, Line 1, in Claim 19, delete "15" and insert -- 15, --, therefor.

Signed and Sealed this
Thirty-first Day of July, 2012

David J. Kappos
*Director of the United States Patent and Trademark Office*